(12) United States Patent
Mikhael et al.

(10) Patent No.: US 7,754,106 B2
(45) Date of Patent: Jul. 13, 2010

(54) CONDUCTIVE FLAKES MANUFACTURED BY COMBINED SPUTTERING AND VAPOR DEPOSITION

(75) Inventors: Michael G. Mikhael, Tucson, AZ (US); Angelo Yializis, Tucson, AZ (US)

(73) Assignee: Sigma Laboratories of Arizona, LLC, Tucson, AZ (US)

( * ) Notice: Subject to any disclaimer, the term of this patent is extended or adjusted under 35 U.S.C. 154(b) by 964 days.

(21) Appl. No.: 11/448,362

(22) Filed: Jun. 7, 2006

(65) Prior Publication Data

US 2006/0226399 A1 Oct. 12, 2006

Related U.S. Application Data

(63) Continuation-in-part of application No. 10/355,373, filed on Jan. 31, 2003, now abandoned.

(51) Int. Cl.
*H01B 1/20* (2006.01)
*H01B 1/22* (2006.01)
*C23C 14/24* (2006.01)
*B29C 69/00* (2006.01)

(52) U.S. Cl. ............... 252/500; 252/514; 252/518.1; 252/519.1; 264/81; 264/140; 427/226; 427/402; 106/1.14; 106/1.19; 106/403; 106/419; 106/441; 423/594.8; 423/623; 423/624

(58) Field of Classification Search ............... 252/500, 252/512–514; 427/255.6, 398.2; 264/81, 264/110; 106/31.13; 428/41.8, 202, 411.1
See application file for complete search history.

(56) References Cited

U.S. PATENT DOCUMENTS

| 4,321,087 | A | * | 3/1982 | Levine et al. ............... 75/356 |
| 5,156,720 | A | | 10/1992 | Rosenfeld et al. |
| 5,440,446 | A | | 8/1995 | Shaw et al. |
| 6,083,628 | A | | 7/2000 | Yializis et al. |
| 6,106,627 | A | | 8/2000 | Yializis et al. |
| 6,270,841 | B1 | | 8/2001 | Mikhael et al. |
| 6,398,999 | B1 | | 6/2002 | Josephy et al. |

FOREIGN PATENT DOCUMENTS

| JP | 11-343436 | 12/1999 |
| JP | 2000-017208 | 1/2000 |
| SU | 1581776 A | 7/1990 |

* cited by examiner

*Primary Examiner*—Stanley Silverman
*Assistant Examiner*—Kallambella Vijayakumar
(74) *Attorney, Agent, or Firm*—Antonio R. Durando

(57) ABSTRACT

A release agent is flash evaporated and deposited onto a support substrate under conventional vapor-deposition conditions and a conductive metal oxide, such as ITO, is subsequently sputtered or deposited by reactive electron beam onto the resulting release layer in the same process chamber to form a very thin film of conductive material. The resulting multilayer product is separated from the support substrate, crushed to brake up the metal-oxide film into flakes, and heated or mixed in a solvent to separate the soluble release layer from the metallic flakes. Thus, by judiciously controlling the deposition of the ITO on the release layer, transparent flakes may be obtained with the desired optical and physical characteristics.

15 Claims, 3 Drawing Sheets

CONDUCTIVE FLAKES MANUFACTURED BY COMBINED SPUTTERING AND VAPOR DEPOSITION

RELATED APPLICATIONS

This application is a continuation-in-part application of U.S. Ser. No. 10/355,373, filed on Jan. 31, 2003 now abandoned.

BACKGROUND OF THE INVENTION

1. Field of the Invention

This invention is related in general to conductive materials used to manufacture clear conductive surfaces. In particular, it pertains to a combined sputtering/vapor-deposition process for manufacturing conductive flakes suitable for conductive inks and coatings.

2. Description of the Related Art

Conductive surfaces are used in many modern applications. For example, touch screens and electrodes for electroluminescent displays incorporate a conductive layer made of conductive metallic or metal-oxide (ceramic) particles dispersed in a clear flexible binder applied to a clear flexible substrate. The conductivity of the layer results from the contact among the individual conductive particles in the dispersion.

Typically, these conductive surfaces are manufactured by dispersing a metallic or metal-oxide powder in a binder and applying the mixture as a coating over a clear substrate. Indium tin oxide (ITO) and indium zinc oxide (IZO) are clear conductive metal oxides most often used for these applications; gold, silver and copper are used to produce opaque conductive layers. The powders are manufactured chemically by precipitation from a solution or mechanically by grinding solid nuggets. The resulting powder particles, normally in the order of nanometers in nominal diameter, tend to be highly reflective, rather than optically transmissive, even though the material in thin-film form may be transparent. This is because the light scattering produced by reflection of dispersed random-shape particles greatly reduces the transparency of the bulk material, just as in the case of pulverized glass particles. Therefore, the application of a conductive powder to a clear substrate such as plastic or glass, while producing a conductive surface, tends to yield a translucent but not perfectly clear layer even when ITO or IZO is used.

It has been known that the metal-oxide compounds commonly used in the manufacture of conductive layers, most commonly ITO and IZO, remain transparent in flake form because of the high aspect ratio associated with the flake form (i.e., the ratio of the nominal diameter of the two-dimensional surface to the thickness of the flake). Accordingly, the use of metal-oxide particles in flake form to manufacture clear conductive surfaces has been known to be desirable for some time. Unfortunately, the only known methods for producing a conductive flake coating involve the processes of sputtering or reactive electron-beam evaporation of the conductive compound with direct deposition onto the clear substrate, which can only be achieved by placing the substrate into the process chamber. This approach is impractical, or even impossible, for large devices that may not fit in conventional vacuum chambers and for surfaces with a complicated geometry that cannot be reached uniformly by sputtering or vapor deposition.

Therefore, the common practice has been to produce translucent conductive layers by coating a clear substrate with inks that contain a metal oxide powder, such as ITO or IZO, dispersed in a binder. This technique has the advantage of allowing the application of the conductive layer to a substrate of any geometry and size, but also has the attendant disadvantage of yielding a relatively opaque product with relatively low conductivity. The present invention is directed at providing a solution to these problems by manufacturing inks and coatings that contain conductive flakes, rather than powders.

BRIEF SUMMARY OF THE INVENTION

Commonly owned U.S. Pat. No. 6,270,841, herein incorporated by reference, describes producing aluminum flakes by evaporating an oligomer in a vacuum chamber, depositing it as a solid coating (0.5 to 1.0 micron thick) on a cold polyester web, and then depositing an aluminum film in-line on top of the polyethylene-oligomer release coating according to conventional vapor deposition. Aluminum metal flakes were produced from the bulk deposition product by crushing the aluminum film within it to produce flakes, and then either melting or dissolving the release material away from the flakes. Similar aluminum-flake products were produced using poly($\alpha$-methylstyrene) oligomers as the release layer. (Aluminum readily oxidize into a non-conductive material; therefore, it is not suitable for manufacturing conductive layers.)

The same approach cannot be followed with ITO, IZO and similar conductive materials because these oxides, which are required in the manufacture of clear conductive surfaces, cannot be evaporated resistively. Therefore, the vapor deposition technique described above for aluminum is not available to produce flakes of these compounds, as would be desirable in order to improve the quality of the clear conductive surfaces used in electroluminescent displays and other applications to which the present invention is directed. On the other hand, these materials may be deposited in thin layers by sputtering or electron-beam evaporation.

Therefore, according to one aspect of the invention, a release agent is flash evaporated and deposited onto a support substrate under conventional vapor-deposition conditions and a conductive-material precursor, such as the metal-oxide ITO, is subsequently sputtered onto the resulting release layer in the same process chamber to form a very thin film of conductive material. The resulting multilayer product is then separated from the support substrate, crushed to brake up the conductive film into flakes, and heated or mixed in a solvent to separate the soluble release layer from the conductive flakes. Thus, by judiciously controlling the deposition of the ITO on the release layer, transparent flakes may be obtained with the desired optical and physical characteristics.

According to another aspect of the invention, the concurrent vapor deposition of the release layer and sputtering of the ITO (or other conductive-material precursor) are carried out continuously on a rotating drum, thereby producing a continuous two-layer spiral of arbitrary length. This allows the continuous production of a large bulk volume of ITO film embedded between release-material layers, which in turn yields extensive quantities of ITO flakes by crushing the layered product and heating or dissolving the release material.

According to yet another aspect of the invention, the flakes so produced are mixed in conventional carriers and binders to make dispersions suitable for application as inks and coatings over clear substrates. As a result, clear conductive surfaces can be obtained in any shape or size simply by applying the mixture of the invention as a coating over a pre-existing clear structure. The clear nature of the ITO flakes so produced provides electrical conductivity without also introducing the opacity that is characteristic of the prior-art inks and coatings based on ITO powders. Because of the higher aspect ratio of flakes with respect to powders, the conductive layers of the invention also provide greater contact among adjacent particles and therefore also greater conductivity than is typically achievable by the use of powders.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The invention is grounded on the idea of vapor depositing a release agent and concurrently sputtering a conductive-material precursor over the resulting solid layer continuously to produce a bulk layered structure from which flakes can be manufactured. The flakes are then used to substitute the powders utilized in conventional inks and coatings for conductive surfaces.

For the purposes of this disclosure, the term flake is defined as a particle of substantially uniform thickness and having an irregular planar shape with a nominal diameter at least one order of magnitude greater than the thickness. The terms nominal diameter and diameter are used interchangeably with respect to a flake to represent the diameter of a circular shape having the same surface area as the planar side of the flake. The term oligomer is used herein (as defined in the patent referenced above) to refer not only to molecular chains normally designated as such in the art (typically containing between two and ten monomer molecules) but also to low-molecular weight polymers; specifically, oligomer is meant to encompass any polymerized molecule having a molecular weight sufficiently low to permit its vaporization under vacuum at a temperature lower than its temperature of thermal decomposition. The term cryocondensation refers to a phase-change process from gas to liquid (and subsequently solid) obtained upon contact with a surface having a temperature lower than the dew point of the gas at a given operating pressure. Finally, the terms conductive-material precursor and conductive precursor are used to refer to any material which is conductive or becomes conductive as a result of oxidation or other chemical reaction when exposed to air under ambient conditions.

Figure 1:
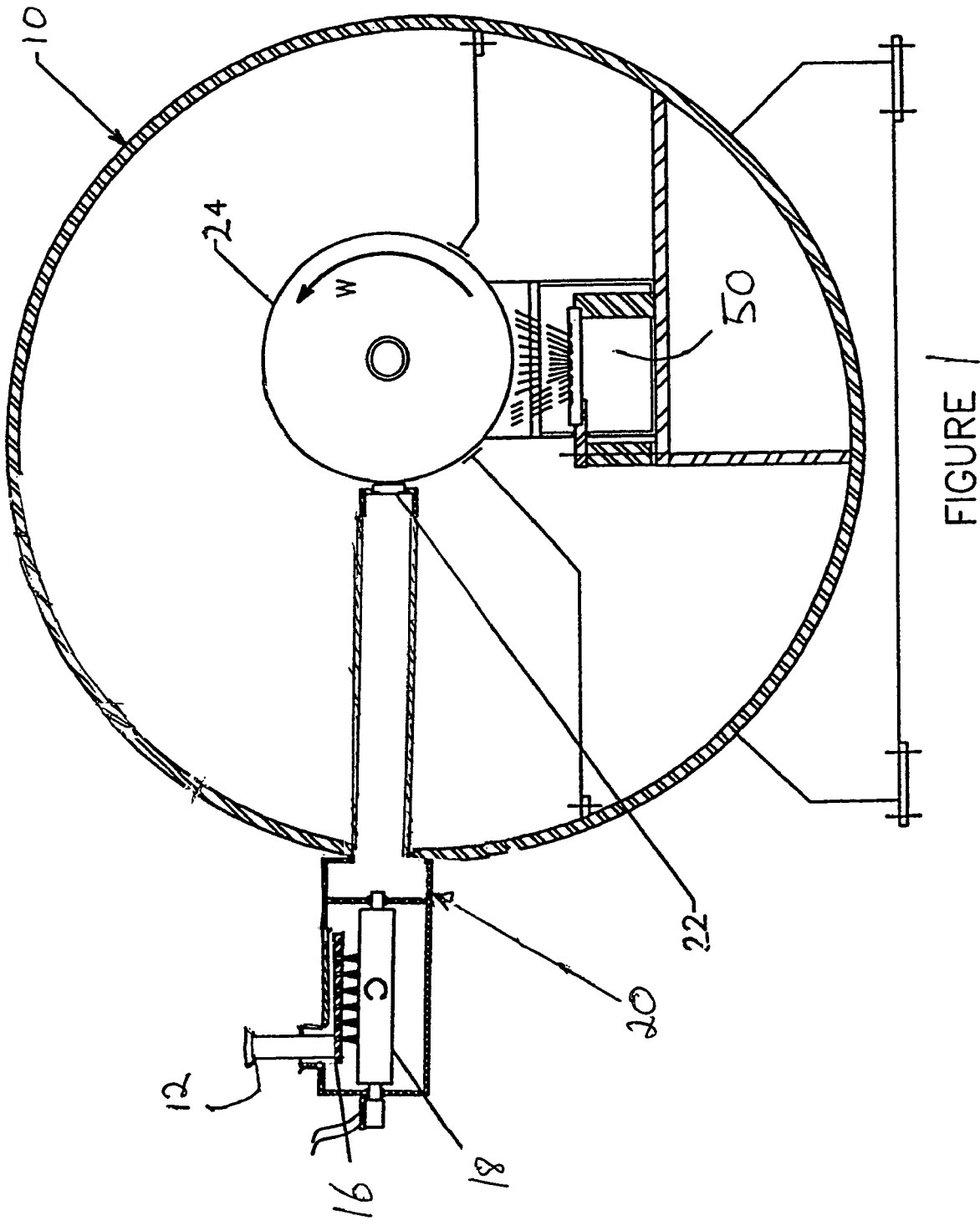
FIG. 1 is a schematic representation of a modified vacuum chamber according to the invention.

The invention is practiced by depositing a thin layer of conductive precursor over a substrate that is then separated from the support medium in the deposition chamber for further processing. Thus, the substrate preferably consists of a layer of release material of the type used in the prior art for manufacturing multi-layer components by vapor deposition. As described in U.S. Pat. No. 6,270,841, such release materials consist preferably of monomers or oligomers that can be flash evaporated and vacuum deposited to form a solvent-free, thermoplastic (soluble and fusible) release layer appropriate for the subsequent manufacture of metal flakes. These release materials have been utilized in the prior art for the production of metal-based pigments. Therefore, in order to practice the invention, a conventional vacuum chamber 10 is modified to enable the concurrent deposition of a conductive metal oxide by a conventional sputtering process, as illustrated schematically in FIG. 1. The release material is granulated or otherwise reduced to particles and fed into a hopper 12 for processing in the vacuum chamber 10. The solid oligomer particles are fed from the hopper 12 into a heated extruder (not shown) that liquefies the material and forces it out of a nozzle 16 as a plurality of thin liquid film strips suitable for flash evaporation. A liquid oligomer could be injected directly through the nozzle 16. The nozzle releases the liquid film continuously onto a heated rotating drum 18 under vacuum which causes its evaporation upon contact. This assembly of parts constitutes the evaporator of a vapor deposition unit 20, as disclosed in the referenced patent for the vapor deposition of oligomers.

The resulting vaporized oligomeric molecule is then passed through a slit 22 to reach the cryocondensation section of the vacuum chamber 10. Upon contact with a rotating cold drum 24 (typically kept at −20° C. to 30° C.), the vapor condenses and forms a uniform, homogeneous thin film that quickly solidifies. As in prior-art vapor deposition units, the thin film may be deposited over the drum 24 or over a continuously fed web substrate in contact with the drum to produce a film coating. No further polymerization is required to solidify the film.

In order to ensure the uniform deposition of the vaporized release material over the condensation drum 24, it is critical that the feed rate of oligomer to the evaporator be controlled precisely. The use of an extruder, which can be run at a well defined and controlled extrusion rate, was found to be ideal for feeding the hot drum in the evaporator section of the vapor deposition unit. At the same time, the use of a slit nozzle that produces a very thin liquid film of oligomer, as described in U.S. Pat. No. 6,270,841, makes it possible to approximate the very large surface area created by atomization, thereby enabling the immediate vaporization of the liquid oligomer upon contact with a hot surface.

Figure 2:
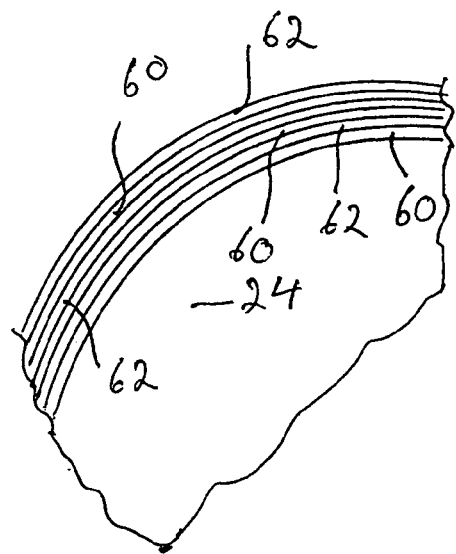
FIG. 2 is an exemplary representation of a pair of release-agent/conductive-film layers continuously wound over a rotating drum to form a multiple-layer spiral.

According to the invention, a dual-magnetron sputtering unit 50 (or equivalently a reactive electron-beam evaporation unit) is included in the chamber 10 to also enable the deposition of metal-oxide particles on the layer of release material previously deposited over the rotating drum 24. In order to manufacture conductive flakes, the sputtered layer is preferably in the order of several hundred angstroms over a release layer of sub-micron thickness. For example, up to 1,000 angstroms of ITO would be sputtered over a 0.1-0.5 micron thick release layer. Therefore, the relative deposition rates need to be adjusted to produce the desired thickness of the respective layers. If the process is carried out continuously on a rotating drum, subsequent depositions of release and conductive precursor produce a continuous spiral of concentric layers 60 and 62 of alternating release and precursor, respectively, as illustrated in the partial view of FIG. 2.

Upon separation from the drum, the release/conductive-precursor layers are processed to release the conductive precursor from the bulk of material. This may be accomplished by mechanical peel off, by melting the release coating, or by dissolving the release coating. Preferably, the bulk product of deposition is crushed to produce flakes of the desired size and a suitable solvent is used to extract the release material from the flakes. Typically, this process yields clear conductive metal-oxide flakes (or other conductive-precursor flakes) about 5-20μ in nominal diameter and up to 0.1μ in thickness, thereby providing the high aspect ratio needed for good transparency of the conductive material used in the manufacture of clear conductive surfaces.

The following examples illustrate the invention. The materials selected for these cases were hydrocarbon oligomers (e.g., polyethylene, polystyrene, polycycloaliphatic, fluorocarbon, and silicone-based oligomer materials) which are known to exhibit very low adhesion to substrate films and other top coatings (metals or metal oxides). These release materials were deposited in a vacuum deposition chamber in layers about 0.5 to 1.0 micron thick over a cold rotating drum. The conductive flakes were produced in the same chamber by sputtering or reactive electron-beam evaporating a film of conductive-material precursor up to about 0.1μ thick continuously over the oligomeric release coating formed by vapor deposition.

EXAMPLE 1

A polyethylene oligomer of molecular weight 4000 (from Aldrich Chemicals Company of Milwaukee, Wis.) was melted at 130° C. and extruded into a $10^{-3}$ to $10^{-6}$ torr vacuum chamber (preferably operated at about $10^{-4}$ torr) to be spread on a hot rotating drum (at about 300° C.) and evaporated. The formed vapor, driven by vacuum, was passed through a slit nozzle from the evaporating area to a deposition chamber and deposited as a solid coating about 0.05-0.10 micron thick on a cold drum kept at about 0° C. An ITO film about 500 Å thick was sputtered in-line on top of the polyethylene-oligomer release coating. The speed of the rotating drum was limited to about 5 linear meters per minute by the ability to sputter ITO, which is significantly slower than the normal rate of vapor deposition of release material. A multilayer sequential ITO/release-coating strap (about 2,000 layers) was formed. After deposition, ITO flakes were produced by crushing the deposited material and then dissolving the release layers in toluene. The resulting flakes were about 500 Å thick, about 10μ in nominal diameter, and clear.

EXAMPLE 2

A poly(α-methylstyrene) oligomer of molecular weight 1300 (Aldrich Chemicals) was melted at 150° C. and extruded into a $10^{-3}$-$10^{-6}$ torr vacuum chamber (operated at about $5\times10^{-4}$ torr) to be spread on a hot rotating drum (at about 300° C.) and evaporated. The formed vapor was deposited as a solid coating about 0.05-0.10μ thick on a cold rotating drum (at about 0° C.). An ITO film about 500 Å thick was deposited by sputtering in-line on top of the poly(α-methylstyrene) oligomer release coating. The drum was running at about 5 mt/min. A multilayer sequential ITO/release-coating strap of about 1,000 layers was formed. The ITO flakes were made by crushing the bulk product and melting away the release layer at about 100° C. The resulting flakes were about 500 Å thick, about 10μ in nominal diameter, and clear. Similar flakes were produced successfully with poly(α-methylstyrene) oligomers of molecular weight up to 2000 and using toluene to separate the flakes from the release layers.

EXAMPLE 3

A polyethylene oligomer of molecular weight 4000 (from Aldrich Chemicals Company of Milwaukee, Wis.) was melted at 130° C. and extruded into a $10^{-3}$-to $10^{-6}$ torr vacuum chamber (at about $5\times10^{4}$ torr) to be spread on a hot rotating drum (at about 300° C.) and evaporated. The formed vapor, driven by vacuum, was passed through a slit nozzle from the evaporating area to a deposition chamber and deposited as a solid coating about 0.05-0.10 micron thick on a cold drum kept at about 0° C. An IZO film about 500 Å thick was sputtered in-line on top of the polyethylene-oligomer release coating. The speed of the rotating drum was limited to about 5 linear meters per minute by the ability to sputter IZO, which is significantly slower than the normal rate of vapor deposition of release material. A multilayer sequential IZO/release-coating strap (about 2,000 layers) was formed. After deposition, IZO flakes were produced by crushing the deposited material and then dissolving the release layers in toluene. The resulting flakes were about 500 Å thick, about 10μ in nominal diameter, and clear.

EXAMPLE 4

A poly(α-methylstyrene) oligomer of molecular weight 1300 (Aldrich Chemicals) was melted at 150° C. and extruded into a $10^{-3}$-$10^{-6}$ torr vacuum chamber (at about $5\times10^{4}$ torr) to be spread on a hot rotating drum (at about 300° C.) and evaporated. The formed vapor was deposited as a solid coating about 0.05-0.10μ thick on a cold rotating drum (at about 0° C.). An IZO film about 500 Å thick was deposited by sputtering in-line on top of the poly(α-methylstyrene) oligomer release coating. The drum was running at about 5 mt/min. A multilayer sequential IZO/release-coating strap of about 1,000 layers was formed. The IZO flakes were made by crushing the bulk product and melting away the release layer at about 100° C. The resulting flakes were about 500 Å thick, about 10μ in nominal diameter, and clear. Similar flakes were produced successfully with poly(α-methylstyrene) oligomers of molecular weight up to 2000 and using toluene to separate the flakes from the release layers.

EXAMPLE 5

A poly(α-methylstyrene) oligomer of molecular weight 1300 (Aldrich Chemicals) was melted at 150° C. and extruded into a $10^{-3}$-$10^{-6}$ torr vacuum chamber (at about $5\times10^{4}$ torr) to be spread on a hot rotating drum (at about 300° C.) and evaporated. The formed vapor was deposited as a solid coating about 0.05-0.10μ thick on a cold rotating drum (at about 0° C.). A silver film about 300 Å thick was deposited by sputtering in-line on top of the poly(α-methylstyrene) oligomer release coating. The drum was running at about 10 mt/min. A multilayer sequential silver/release-coating strap of about 3,000 layers was formed. The silver flakes were made by crushing the bulk product and melting away the release layer at about 100° C. The resulting flakes were about 300 Å thick and about 15-20µ in nominal diameter.

EXAMPLE 6

Profetic

A poly(α-methylstyrene) oligomer of molecular weight 1300 (Aldrich Chemicals) is melted at 150° C. and extruded into a $10^{-3}$-$10^{-6}$ torr vacuum chamber (at about $5 \times 10^4$ torr) to be spread on a hot rotating drum (at about 300° C.) and evaporated. The formed vapor is deposited as a solid coating about 0.05-0.10µ thick on a cold rotating drum (at about 0° C.). A gold film about 300 Å thick is deposited by sputtering in-line on top of the poly (α-methylstyrene) oligomer release coating. The drum is running at about 10 mt/min. A multilayer sequential gold/release-coating strap of about 3,000 layers is formed. The gold flakes are made by crushing the bulk product and melting away the release layer at about 100° C. The resulting flakes are about 300 Å thick and about 15-20µ in nominal diameter.

As would be clear to one skilled in the art, it is noted that silver and gold could be resistively evaporated as well. In such a case, the drum speed could be greatly increased (to 100-500 mt/min) because resistive evaporation is a much faster process than either sputtering or reactive electron-beam evaporation.

These examples demonstrate the feasibility of manufacturing clear flakes of conductive metal oxides and other conductive precursors by combining sputtering with vacuum vapor deposition to produce a multilayer bulk product that is then crushed and processed to separate the flakes from the release material. The process possesses the advantage of producing conductive flakes with a controllably high aspect ratio, as needed to yield transparent non-reflective flakes optimally suitable for inks and coatings used to manufacture conductive surfaces. Because of its continuous operation and application over a rotating drum, the process also produces flakes at much higher rates than prior-art chemical and mechanical techniques.

Figure 4:
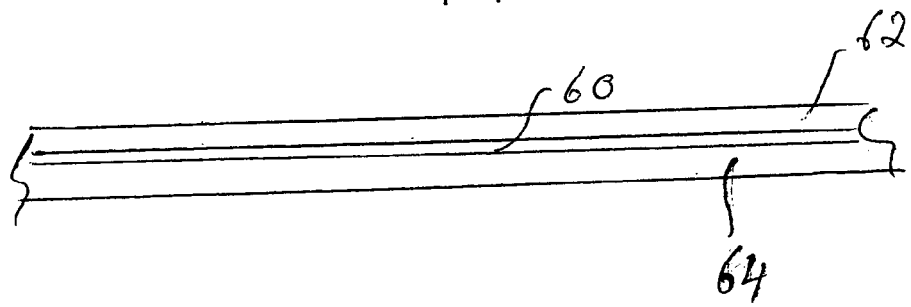
FIG. 4 is an exemplary representation of a layer of release agent and a layer of conductive film deposited over a web in contact with a rotating drum in the vacuum chamber.
Figure 3:
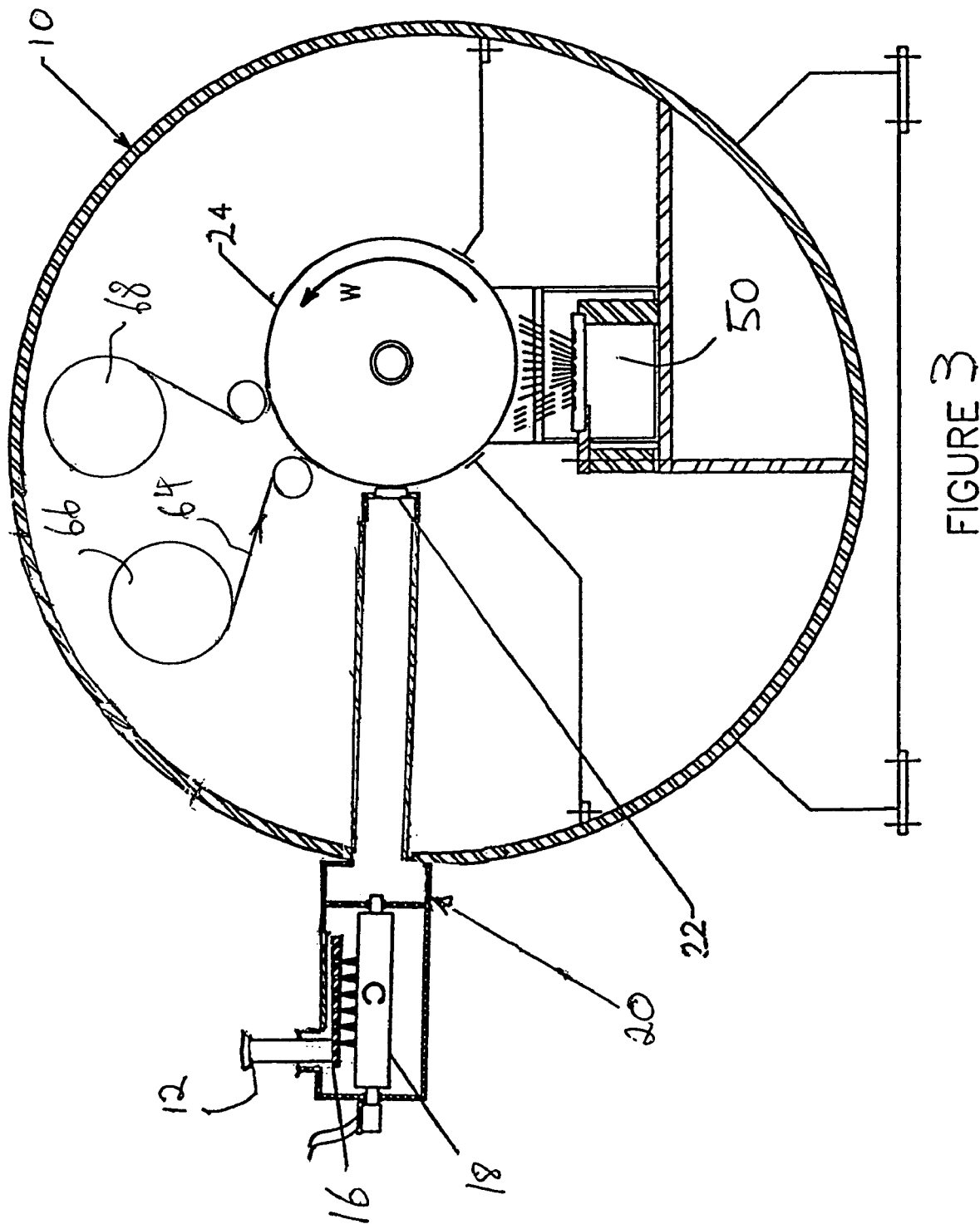
FIG. 3 is a schematic representation of a modified vacuum chamber according to the invention wherein the release material and the conductive film are deposited over a web in contact with a rotating drum.

It is clear that the process of the invention could be carried out in equivalent fashion using a web over which the release material and the conductive material are deposited, in that order, in the vacuum chamber. As illustrated in FIG. 3, the web 64 is run continuously in contact with the cold surface of the drum 24, and the materials are deposited over the web as it progresses from a feed roll 66 to a take-up roll 68. In such case, a two-layer product is obtained (a conductive film and a layer of release material over the web, as illustrated in FIG. 4), which can be separated from the web and treated, as explained above, to crush the conductive film into flakes and separate them from the release layer.

Figure 5:
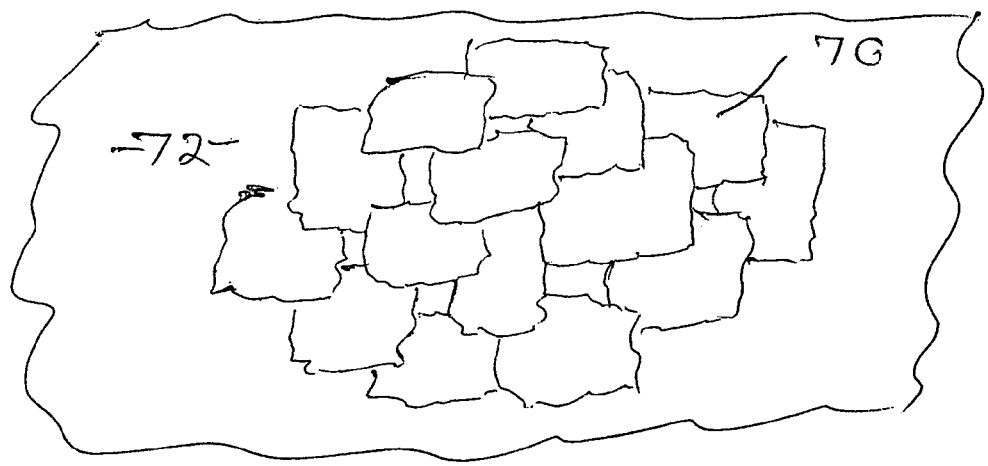
FIG. 5 is a schematic representation of conductive flakes in a binder to provide a conductive ink according to the invention.

The flakes so produced according to the invention were then dispersed in conventional ink and coating binders for application over a clear surface. For example, a dispersion of about 40 percent by weight ITO flakes (500 Å and 10µ in diameter and thickness, respectively) was sprayed as an ink over a clear plastic substrate to manufacture a clear electrode for electroluminescent devices. Similarly, a dispersion of 50 percent by weight IZO flakes (500 Å×10µ) was applied as a coating over a glass substrate to manufacture a clear electrode for electroluminescent devices. FIG. 5 illustrates how conductive flakes 70 overlap in dispersion in a binder 72 to provide an improved conductive ink.

Based on these experimental tests, a preferred conductive ink composition using ITO may be made approximately as follows (in percent by weight):

| | |
|---|---|
| ITO | 45% |
| Radiation-Curable Acrylate | 50% |
| Photoinitiator | 5% |
| | 100% |

A preferred conductive coating composition based on ITO may be produced approximately as follows (in percent by weight):

| | |
|---|---|
| ITO | 25% |
| Single-component Polyurethane Binder | 45% |
| Diluent (Ethyl Acetate) | 30% |
| | 100% |

A preferred conductive ink composition using IZO may be made approximately as follows (in percent by weight):

| | |
|---|---|
| IZO | 45% |
| Radiation-Curable Acrylate | 50% |
| Photoinitiator | 5% |
| | 100% |

A preferred conductive coating composition based on IZO is as follows (in percent by weight):

| | |
|---|---|
| IZO | 25% |
| Single-component Polyurethane Binder | 45% |
| Diluent (Ethyl Acetate) | 30% |
| | 100% |

A preferred conductive coating composition based on silver may be obtained as follows (in percent by weight):

| | |
|---|---|
| Ag | 60% |
| Single-component Polyurethane Binder | 30% |
| Diluent (Ethyl Acetate) | 10% |
| | 100% |

While these formulations are considered preferred for the applications currently contemplated, those skilled in the art will recognize that wide ranges of composition for each ingredient may be used to change the properties of the final product. For example, a greater proportion of binder would be used to produce a mechanically stronger product. Similarly, a greater proportion of flake will produce a product with higher conductivity. Therefore, the invention is not limited to any particular composition.

Thus, this invention demonstrates that the process of sputtering (or, equivalently, of reactive electron-beam evaporation) can be advantageously combined with conventional flash evaporation and vacuum vapor deposition to form a thin film of conductive precursor that can then be crushed to obtain conductive particles in flake form. These flakes can then be used in conventional inks and coatings to improve the electrical properties and transparency of conductive surfaces.

Various changes in the details, steps and components that have been described may be made by those skilled in the art within the principles and scope of the invention herein illustrated and defined in the appended claims. For example, while the invention has been described mainly in terms of ITO and IZO as metal oxides used to manufacture flakes, other conductive materials are well known in the art as suitable for making conductive surfaces. These include, without limitation, metals that yield a conductive flake either because they do not oxidize (such as gold, palladium, platinum, and nickel) or because they produce a conductive oxide (such as silver and copper). Like ITO and IZO, these materials can be deposited in vacuum by sputtering or reactive electron-beam evaporation. Therefore, they are also suitable to practice the invention for the production of particles in the form of flakes.

Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A process for producing a conductive coating, comprising the following steps:
   (a) flash evaporating a release material in a vacuum chamber to produce a vapor, said release material being selected from the group consisting of polyethylene oligomers, poly(-methylstyrene) oligomers, polycycloaliphatic oligomers, fluorocarbon oligomers, and silicone-based oligomer;
   (b) cryocondensing the vapor to produce a solid film of said release material having a thickness not greater than 1 micron;
   (c) sputtering or reactive electron-beam depositing indium tin oxide (ITO) to form a layer thereof on said film of release material;
   wherein said steps (a)-(c) are carried out continuously in said vacuum chamber to form a multi-layer structure of at least 1,000 layers of said ITO;
   (d) crushing said layers of ITO to produce conductive flakes;
   (e) isolating said conductive flakes from the release material; and
   (f) dispersing the conductive flakes produced in step (e) in a binder to produce a conductive coating having the following composition:
   about 25% by weight ITO,
   about 45% by weight polyurethane, and
   about 30% by weight ethyl acetate.

2. The process of claim 1, wherein said steps (a)-(c) are carried out continuously over a rotating drum.

3. The process of claim 1, wherein said steps (a)-(c) are carried out continuously over a web in contact with a rotating drum.

4. A process for producing a conductive coating, comprising the following steps:
   (a) flash evaporating a release material in a vacuum chamber to produce a vapor, said release material being selected from the group consisting of polyethylene oligomers, poly(-methylstyrene) oligomers, polycycloaliphatic oligomers, fluorocarbon oligomers, and silicone-based oligomer;
   (b) cryocondensing the vapor to produce a solid film of said release material having a thickness not greater than 1 micron;
   (c) sputtering or reactive electron-beam depositing indium zinc oxide (IZO) to form a layer thereof on said film of release material;
   wherein said steps (a)-(c) are carried out continuously in said vacuum chamber to form a multi-layer structure of at least 1,000 layers of said IZO;
   (d) crushing said layers of IZO to produce conductive flakes;
   (e) isolating said conductive flakes from the release material; and
   (f) dispersing the conductive flakes produced in step (e) in a binder to produce a conductive coating having the following composition:
   about 25% by weight IZO,
   about 45% by weight polyurethane, and
   about 30% by weight ethyl acetate.

5. The process of claim 4, wherein said steps (a)-(c) are carried out continuously over a rotating drum.

6. The process of claim 4, wherein said steps (a)-(c) are carried out continuously over a web in contact with a rotating drum.

7. A process for producing a conductive coating, comprising the following steps:
   (a) flash evaporating a release material in a vacuum chamber to produce a vapor, said release material being selected from the group consisting of polyethylene oligomers, poly(-methylstyrene) oligomers, polycycloaliphatic oligomers, fluorocarbon oligomers, and silicone-based oligomer;
   (b) cryocondensing the vapor to produce a solid film of said release material having a thickness not greater than 1 micron;
   (c) sputtering or reactive electron-beam depositing silver to form a layer thereof on said film of release material;
   wherein said steps (a)-(c) are carried out continuously in said vacuum chamber to form a multi-layer structure of at least 1,000 layers of said silver;
   (d) crushing said layers of silver to produce conductive flakes;
   (e) isolating said conductive flakes from the release material; and
   (f) dispersing the conductive flakes produced in step (e) in a binder to produce a conductive coating having the following composition:
   about 60% by weight silver,
   about 30% by weight polyurethane, and
   about 10% by weight ethyl acetate.

8. The process of claim 7, wherein said steps (a)-(c) are carried out continuously over a rotating drum.

9. The process of claim 7, wherein said steps (a)-(c) are carried out continuously over a web in contact with a rotating drum.

10. A process for manufacturing a conductive ink, comprising the following steps:
    (a) flash evaporating a release material in a vacuum chamber to produce a vapor, said release material being selected from the group consisting of polyethylene oligomers, poly(-methylstyrene) oligomers, polycycloaliphatic oligomers, fluorocarbon oligomers, and silicone-based oligomers;
    (b) cryocondensing the vapor to produce a solid film of said release material having a thickness not greater than 1 micron;
    (c) sputtering or reactive electron-beam depositing indium tin oxide (ITO) to form a layer thereof on said film of release material;

wherein said steps (a)-(c) are carried out continuously in said vacuum chamber to form a multi-layer structure of at least 1,000 layers of said ITO;
(d) crushing said layers of ITO to produce conductive flakes; and
(e) isolating said conductive flakes from the release material: and
(f) dispersing the conductive flakes produced in step (e) in a binder to produce a conductive ink having the following composition:
about 45% by weight ITO,
about 50% by weight acrylate, and
about 5% by weight photoinitiator.

11. The process of claim 10, wherein said steps (a)-(c) are carried out continuously over a rotating drum.

12. The process of claim 10, wherein said steps (a)-(c) are carried out continuously over a web in contact with a rotating drum.

13. A process for manufacturing a conductive ink, comprising the following steps:
(a) flash evaporating a release material in a vacuum chamber to produce a vapor, said release material being selected from the group consisting of polyethylene oligomers, poly(-methylstyrene) oligomers, polycycloaliphatic oligomers, fluorocarbon oligomers, and silicone-based oligomers;
(b) cryocondensing the vapor to produce a solid film of said release material having a thickness not greater than 1 micron;
(c) sputtering or reactive electron-beam depositing indium zinc oxide (IZO) to form a layer thereof on said film of release material;
wherein said steps (a)-(c) are carried out continuously in said vacuum chamber to form a multi-layer structure of at least 1,000 layers of said ITO;
(d) crushing said layers of IZO to produce conductive flakes; and
(e) isolating said conductive flakes from the release material: and
(f) dispersing the conductive flakes produced in step (e) in a binder to produce a conductive ink having the following composition:
about 45% by weight IZO,
about 50% by weight acrylate , and
about 5% by weight photoinitiator.

14. The process of claim 13, wherein said steps (a)-(c) are carried out continuously over a rotating drum.

15. The process of claim 13, wherein said steps (a)-(c) are carried out continuously over a web in contact with a rotating drum.

* * * * *